United States Patent
Lee et al.

(10) Patent No.: US 12,198,035 B2
(45) Date of Patent: Jan. 14, 2025

(54) METHOD FOR PREDICTING THE AREAS OF INFORMATION NEEDED TO BE COLLECTED

(71) Applicants: MakinaRocks Co., Ltd., Seoul (KR); Hanon Systems, Daejeon (KR)

(72) Inventors: Taeho Lee, Seoul (KR); Minseop Kim, Seoul (KR); Sanghyeok Choi, Seoul (KR); Jeonghoon Lee, Sejong-si (KR); Joongjae Kim, Daejeon (KR); Ikchan Ju, Daejeon (KR)

(73) Assignees: MAKINAROCKS CO., LTD., Seoul (KR); HANON SYSTEMS, Daejeon (KR)

( * ) Notice: Subject to any disclaimer, the term of this patent is extended or adjusted under 35 U.S.C. 154(b) by 0 days.

(21) Appl. No.: 18/482,693

(22) Filed: Oct. 6, 2023

(65) Prior Publication Data
US 2024/0160895 A1     May 16, 2024

(30) Foreign Application Priority Data

Nov. 14, 2022   (KR) .................. 10-2022-0151350
Jan. 12, 2023   (KR) .................. 10-2023-0004781

(51) Int. Cl.
G06N 3/045    (2023.01)
G06N 3/092    (2023.01)

(52) U.S. Cl.
CPC ............. *G06N 3/045* (2023.01); *G06N 3/092* (2023.01)

(58) Field of Classification Search
CPC ................................ G06N 3/045; G06N 3/092
See application file for complete search history.

(56) References Cited

U.S. PATENT DOCUMENTS

| 10,636,295 | B1 | 4/2020 | Kim et al. |
| 11,314,258 | B2* | 4/2022 | Gomez Gutierrez ........ G05D 1/0221 |
| 11,562,167 | B2 | 1/2023 | Yoon et al. |
| 12,039,728 | B2* | 7/2024 | Browning ............. G06T 7/0012 |
| 2010/0023307 | A1* | 1/2010 | Lee .................... G06F 18/2321 703/7 |
| 2021/0073912 | A1 | 3/2021 | Silva et al. |

(Continued)

FOREIGN PATENT DOCUMENTS

| KR | 1020200084453 A | 7/2020 |
| KR | 1020200094650 A | 8/2020 |

(Continued)

OTHER PUBLICATIONS

Cui et al. ("Uncertainty-Aware Data Aggregation for Deep Imitation Learning", (ICRA) May 20-24, 2019 pp. 761-767) (Year: 2019).*

(Continued)

*Primary Examiner* — Michael J Huntley
*Assistant Examiner* — Imad Kassim
(74) *Attorney, Agent, or Firm* — Umberg Zipser LLP

(57) ABSTRACT

Disclosed is a method for predicting areas of environmental information needed to be collected, which is performed by one or more processors of a computing device. The method may include: outputting one or more episodes based on environmental information; measuring uncertainty for each of the one or more episodes; and predicting an area of the environmental information needed to be collected based on the measured uncertainty.

7 Claims, 7 Drawing Sheets

(56) References Cited

U.S. PATENT DOCUMENTS

2021/0374545 A1    12/2021    Kim et al.
2022/0245312 A1    8/2022    Wyrwas et al.

FOREIGN PATENT DOCUMENTS

| | | |
|---|---|---|
| KR | 1020200116831 A | 10/2020 |
| KR | 1020210064794 A | 6/2021 |
| KR | 1020210147771 A | 12/2021 |
| KR | 1020220049709 A | 4/2022 |
| KR | 102461569 B1 | 11/2022 |

OTHER PUBLICATIONS

Hu et al. ("A Multirange Vehicle Speed Prediction With Application to Model Predictive Control-Based Integrated Power and Thermal Management of Connected Hybrid Electric Vehicles", vol. 144, Jan. 2022) (Year: 2022).*

Lutjens et al. ("Safe Reinforcement Learning with Model Uncertainty Estimates", May 20-24, 2019 pp. 8662-8664). (Year: 2019).*

Steinbrener et al. ("Measuring the Uncertainty of Predictions in Deep Neural Networks with Variational Inference", Sensors 2020) (Year: 2020).*

Chen et al. ("Autonomous Exploration Under Uncertainty via Deep Reinforcement Learning on Graphs", 2020 IEEE) (Year: 2020).*

Zhao et al. ("Uncertainty-based Decision Making Using Deep Reinforcement Learning", 22nd International Conference on Information Fusion, Jul. 2-5, 2019) (Year: 2019).*

* cited by examiner

METHOD FOR PREDICTING THE AREAS OF INFORMATION NEEDED TO BE COLLECTED

CROSS-REFERENCE TO RELATED APPLICATIONS

This application claims priority to and the benefit of Korean Patent Application No. 10-2022-0151350 filed in the Korean Intellectual Property Office on Nov. 14, 2022, the entire contents of which are incorporated herein by reference.

TECHNICAL FIELD

The present disclosure relates to a method for predicting the areas of information needed to be collected, and more particularly, to a method for predicting the areas of environmental information needed to be collected by using uncertainty information.

BACKGROUND ART

In the case of the methodology for setting the existing lack of data collection area, there is a problem that it is difficult to expect consistent performance by setting the data collection area intuitively and applying the set data collection area to various data areas.

For example, when the data collection area is set based on the conventional accuracy, data produced by a dynamics model, data outside a collection range cannot be known ground truth, and there is no comparison target to set the collection area of the lack of data.

Even if the data collection area is set by counting the number of data, even if the number of data is the same, the difficulty of learning depends on the data area, which is difficult to set the data collection area.

Therefore, there is a need for a method to have consistent performance by applying the data collection area to various data areas.

On the other hand, the present disclosure has been derived at least based on the technical background described above, but the technical problem or object of the present disclosure is not limited to solving the problems or disadvantages described above. That is, the present disclosure may cover various technical issues related to the content to be described below, in addition to the technical issues discussed above.

SUMMARY OF THE INVENTION

The present disclosure has been made in an effort to predict the areas of environmental information needed to be collected by using uncertainty information.

Meanwhile, a technical object to be achieved by the present disclosure is not limited to the above-mentioned technical object, and various technical objects can be included within the scope which is apparent to those skilled in the art from contents to be described below.

An exemplary embodiment of the present disclosure provides a method performed by a computing device. The method may include: outputting one or more episodes based on environmental information; measuring uncertainty for each of the one or more episodes; and predicting an area of the environmental information needed to be collected based on the measured uncertainty.

Alternatively, the environmental information may include external environmental information, internal environmental information, and control information, the external environmental information may include at least one of a vehicle speed, an external temperature, an air flow of an air conditioning device, an air inflow amount, weather information, or external humidity, the internal environmental information may include at least one of evaporator information, heater information, cooler information, waste heat recovery information, temperature information, humidity information, air cleanliness information, or air flow information, and the control information may include at least one of compressor information, valve information, heating amount information, control information for an condenser, control information for an evaporator, control information for a radiator, control information for an accumulator, control information for a chiller, control information for an outdoor heat exchanger, control information for an air purifying device, or control information for a waste heat recovery device.

Alternatively, the outputting of one or more episodes based on the environmental information may include outputting one or more episodes by inputting the environmental information into a first neural network model, and wherein the first neural network model may correspond to a neural network model pre-trained based on the environmental information.

Alternatively, the outputting of one or more episodes by inputting the environmental information into the first neural network model may include adjusting the external environmental information included in the environmental information, and outputting one or more episodes based on the adjusted external environmental information.

Alternatively, the first neural network model may include a reinforcement-learning agent and an environment to which the agent belongs, and wherein the environment to which the agent belongs may be implemented based on a dynamics model.

Alternatively, the measuring of the uncertainty for each of the one or more episodes may include measuring uncertainty for each of the one or more episodes by inputting the one or more episodes into a second neural network model, and calculating an average of uncertainties measured for the one or more episodes, and the predicting of the area of the environmental information needed to be collected based on the measured uncertainty may include predicting a collection area of data based on the calculated average of the uncertainties.

Alternatively, the predicting of the collection area of the data based on the calculated average of the uncertainties may include choosing a largest average of the uncertainties among the calculated averages of the uncertainties, and selecting an area of the environmental information corresponding to the chosen largest average of the uncertainties and predicting the selected area of the environmental information as the area of the environmental information needed to be collected.

Alternatively, the second neural network model may be pre-trained based on the environmental information, and may correspond to a neural network model in which a Monte Carlo dropout scheme is used.

Another exemplary embodiment of the present disclosure provides a computer program stored in a non-transitory computer-readable storage medium. when the computer program is executed by one or more processors, the computer program causes the one or more processors to perform operations for predicting an area of environmental information needed to be collected, and the operations may include: an operation of outputting one or more episodes based on environmental information; an operation of measuring uncertainty for each of the one or more episodes; and an operation of predicting an area of the environmental information needed to be collected based on the measured uncertainty.

Still another exemplary embodiment of the present disclosure provides a computing device. The device may include: at least one processor; and a memory, and the processor may be configured to: output one or more episodes based on environmental information, measure uncertainty for each of the one or more episodes, and predict the an area of the environmental information needed to be collected based on the measured uncertainty.

According to an exemplary embodiment of the present disclosure, it is possible to predict an area of environmental information needed to be collected by using uncertainty information.

Meanwhile, the effects of the present disclosure are not limited to the above-mentioned effects, and various effects can be included within the scope which is apparent to those skilled in the art from contents to be described below.

DETAILED DESCRIPTION

Figure 1:
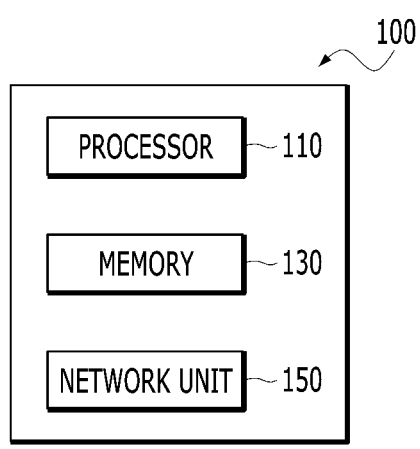
FIG. 1 is a block diagram of a computing device for predicting an area of environmental information needed to be collected according to an exemplary embodiment of the present disclosure.

Various exemplary embodiments will now be described with reference to drawings. In the present specification, various descriptions are presented to provide appreciation of the present disclosure. However, it is apparent that the exemplary embodiments can be executed without the specific description.

"Component", "module", "system", and the like which are terms used in the specification refer to a computer-related entity, hardware, firmware, software, and a combination of the software and the hardware, or execution of the software. For example, the component may be a processing procedure executed on a processor, the processor, an object, an execution thread, a program, and/or a computer, but is not limited thereto. For example, both an application executed in a computing device and the computing device may be the components. One or more components may reside within the processor and/or a thread of execution. One component may be localized in one computer. One component may be distributed between two or more computers. Further, the components may be executed by various computer-readable media having various data structures, which are stored therein. The components may perform communication through local and/or remote processing according to a signal (for example, data transmitted from another system through a network such as the Internet through data and/or a signal from one component that interacts with other components in a local system and a distribution system) having one or more data packets, for example.

The term "or" is intended to mean not exclusive "or" but inclusive "or". That is, when not separately specified or not clear in terms of a context, a sentence "X uses A or B" is intended to mean one of the natural inclusive substitutions. That is, the sentence "X uses A or B" may be applied to any of the case where X uses A, the case where X uses B, or the case where X uses both A and B. Further, it should be understood that the term "and/or" used in this specification designates and includes all available combinations of one or more items among enumerated related items.

It should be appreciated that the term "comprise" and/or "comprising" means presence of corresponding features and/or components. However, it should be appreciated that the term "comprises" and/or "comprising" means that presence or addition of one or more other features, components, and/or a group thereof is not excluded. Further, when not separately specified or it is not clear in terms of the context that a singular form is indicated, it should be construed that the singular form generally means "one or more" in this specification and the claims.

The term "at least one of A or B" should be interpreted to mean "a case including only A", "a case including only B", and "a case in which A and B are combined".

Those skilled in the art need to recognize that various illustrative logical blocks, configurations, modules, circuits, means, logic, and algorithm steps described in connection with the exemplary embodiments disclosed herein may be additionally implemented as electronic hardware, computer software, or combinations of both sides. To clearly illustrate the interchangeability of hardware and software, various illustrative components, blocks, configurations, means, logic, modules, circuits, and steps have been described above generally in terms of their functionalities. Whether the functionalities are implemented as the hardware or software depends on a specific application and design restrictions given to an entire system. Skilled artisans may implement the described functionalities in various ways for each particular application. However, such implementation decisions should not be interpreted as causing a departure from the scope of the present disclosure.

The description of the presented exemplary embodiments is provided so that those skilled in the art of the present disclosure use or implement the present disclosure. Various modifications to the exemplary embodiments will be apparent to those skilled in the art. Generic principles defined herein may be applied to other embodiments without departing from the scope of the present disclosure. Therefore, the present disclosure is not limited to the exemplary embodiments presented herein. The present disclosure should be analyzed within the widest range which is coherent with the principles and new features presented herein.

In the present disclosure, a network function, an artificial neural network, and a neural network may be used to be exchangeable.

FIG. 1 is a block diagram of a computing device for predicting the areas of environmental information needed to be collected according to an exemplary embodiment of the present disclosure.

A configuration of the computing device 100 illustrated in FIG. 1 is only an example shown through simplification. In an exemplary embodiment of the present disclosure, the computing device 100 may include other components for performing a computing environment of the computing device 100 and only some of the disclosed components may constitute the computing device 100.

The computing device 100 may include a processor 110, a memory 130, and a network unit 150.

The processor 110 may be constituted by one or more cores and may include processors for data analysis and deep learning, which include a central processing unit (CPU), a general purpose graphics processing unit (GPGPU), a tensor processing unit (TPU), and the like of the computing device. The processor 110 may read a computer program stored in the memory 130 to perform data processing for machine learning according to an exemplary embodiment of the present disclosure. According to an exemplary embodiment of the present disclosure, the processor 110 may perform a calculation for learning the neural network. The processor 110 may perform calculations for learning the neural network, which include processing of input data for learning in deep learning (DL), extracting a feature in the input data, calculating an error, updating a weight of the neural network using backpropagation, and the like. At least one of the CPU, GPGPU, and TPU of the processor 110 may process learning of a network function. For example, both the CPU and the GPGPU may process the learning of the network function and data classification using the network function. Further, in an exemplary embodiment of the present disclosure, processors of a plurality of computing devices may be used together to process the learning of the network function and the data classification using the network function. Further, the computer program executed in the computing device according to an exemplary embodiment of the present disclosure may be a CPU, GPGPU, or TPU executable program.

According to an exemplary embodiment of the present disclosure, the memory 130 may store any type of information generated or determined by the processor 110 or any type of information received by the network unit 150.

According to an exemplary embodiment of the present disclosure, the memory 130 may include at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The computing device 100 may operate in connection with a web storage performing a storing function of the memory 130 on the Internet. The description of the memory is just an example and the present disclosure is not limited thereto.

The network unit 150 according to several embodiments of the present disclosure may use various wired communication systems, such as a Public Switched Telephone Network (PSTN), an x Digital Subscriber Line (xDSL), a Rate Adaptive DSL (RADSL), a Multi Rate DSL (MDSL), a Very High Speed DSL (VDSL), a Universal Asymmetric DSL (UADSL), a High Bit Rate DSL (HDSL), and a local area network (LAN).

The network unit 150 presented in the present specification may use various wireless communication systems, such as Code Division Multi Access (CDMA), Time Division Multi Access (TDMA), Frequency Division Multi Access (FDMA), Orthogonal Frequency Division Multi Access (OFDMA), Single Carrier-FDMA (SC-FDMA), and other systems.

In the present disclosure, the network unit 150 may be configured regardless of communication modes such as wired and wireless modes and constituted by various communication networks including a personal area network (PAN), a wide area network (WAN), and the like. Further, the network may be known World Wide Web (WWW) and may adopt a wireless transmission technology used for short-distance communication, such as infrared data association (IrDA) or Bluetooth. The techniques described in the present disclosure may also be used in other networks mentioned above.

Figure 2:
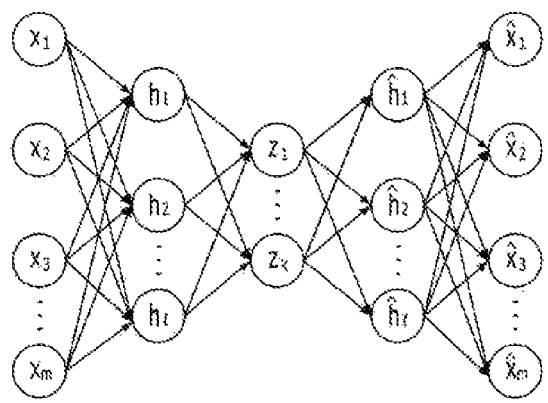
FIG. 2 is a schematic view illustrating a network function according to an exemplary embodiment of the present disclosure.

FIG. 2 is a schematic diagram illustrating a network function according to an exemplary embodiment of the present disclosure.

Throughout the present specification, a computation model, the neural network, a network function, and the neural network may be used as the same meaning. The neural network may be generally constituted by an aggregate of calculation units which are mutually connected to each other, which may be called nodes. The nodes may also be called neurons. The neural network is configured to include one or more nodes. The nodes (alternatively, neurons) constituting the neural networks may be connected to each other by one or more links.

In the neural network, one or more nodes connected through the link may relatively form the relationship between an input node and an output node. Concepts of the input node and the output node are relative and a predetermined node which has the output node relationship with respect to one node may have the input node relationship in the relationship with another node and vice versa. As described above, the relationship of the input node to the output node may be generated based on the link. One or more output nodes may be connected to one input node through the link and vice versa.

In the relationship of the input node and the output node connected through one link, a value of data of the output node may be determined based on data input in the input node. Here, a link connecting the input node and the output node to each other may have a weight. The weight may be variable and the weight is variable by a user or an algorithm in order for the neural network to perform a desired function. For example, when one or more input nodes are mutually connected to one output node by the respective links, the output node may determine an output node value based on values input in the input nodes connected with the output node and the weights set in the links corresponding to the respective input nodes.

As described above, in the neural network, one or more nodes are connected to each other through one or more links to form a relationship of the input node and output node in the neural network. A characteristic of the neural network may be determined according to the number of nodes, the number of links, correlations between the nodes and the links, and values of the weights granted to the respective links in the neural network. For example, when the same number of nodes and links exist and there are two neural networks in which the weight values of the links are different from each other, it may be recognized that two neural networks are different from each other.

The neural network may be constituted by a set of one or more nodes. A subset of the nodes constituting the neural network may constitute a layer. Some of the nodes constituting the neural network may constitute one layer based on the distances from the initial input node. For example, a set of nodes of which distance from the initial input node is n may constitute n layers. The distance from the initial input node may be defined by the minimum number of links which should be passed through for reaching the corresponding node from the initial input node. However, a definition of the layer is predetermined for description and the order of the layer in the neural network may be defined by a method different from the aforementioned method. For example, the layers of the nodes may be defined by the distance from a final output node.

The initial input node may mean one or more nodes in which data is directly input without passing through the links in the relationships with other nodes among the nodes in the neural network. Alternatively, in the neural network, in the relationship between the nodes based on the link, the initial input node may mean nodes which do not have other input nodes connected through the links. Similarly thereto, the final output node may mean one or more nodes which do not have the output node in the relationship with other nodes among the nodes in the neural network. Further, a hidden node may mean nodes constituting the neural network other than the initial input node and the final output node.

In the neural network according to an exemplary embodiment of the present disclosure, the number of nodes of the input layer may be the same as the number of nodes of the output layer, and the neural network may be a neural network of a type in which the number of nodes decreases and then, increases again from the input layer to the hidden layer. Further, in the neural network according to another exemplary embodiment of the present disclosure, the number of nodes of the input layer may be smaller than the number of nodes of the output layer, and the neural network may be a neural network of a type in which the number of nodes decreases from the input layer to the hidden layer. Further, in the neural network according to yet another exemplary embodiment of the present disclosure, the number of nodes of the input layer may be larger than the number of nodes of the output layer, and the neural network may be a neural network of a type in which the number of nodes increases from the input layer to the hidden layer. The neural network according to still yet another exemplary embodiment of the present disclosure may be a neural network of a type in which the neural networks are combined.

A deep neural network (DNN) may refer to a neural network that includes a plurality of hidden layers in addition to the input and output layers. When the deep neural network is used, the latent structures of data may be determined. That is, latent structures of photos, text, video, voice, and music (e.g., what objects are in the photo, what the content and feelings of the text are, what the content and feelings of the voice are) may be determined. The deep neural network may include a convolutional neural network (CNN), a recurrent neural network (RNN), an auto encoder, generative adversarial networks (GAN), a restricted Boltzmann machine (RBM), a deep belief network (DBN), a Q network, a U network, a Siam network, a Generative Adversarial Network (GAN), and the like. The description of the deep neural network described above is just an example and the present disclosure is not limited thereto.

The neural network may be learned in at least one scheme of supervised learning, unsupervised learning, semi supervised learning, or reinforcement learning. The learning of the neural network may be a process in which the neural network applies knowledge for performing a specific operation to the neural network.

The neural network may be learned in a direction to minimize errors of an output. The learning of the neural network is a process of repeatedly inputting learning data into the neural network and calculating the output of the neural network for the learning data and the error of a target and back-propagating the errors of the neural network from the output layer of the neural network toward the input layer in a direction to reduce the errors to update the weight of each node of the neural network. In the case of the supervised learning, the learning data labeled with a correct answer is used for each learning data (i.e., the labeled learning data) and in the case of the unsupervised learning, the correct answer may not be labeled in each learning data. That is, for example, the learning data in the case of the supervised learning related to the data classification may be data in which category is labeled in each learning data. The labeled learning data is input to the neural network, and the error may be calculated by comparing the output (category) of the neural network with the label of the learning data. As another example, in the case of the unsupervised learning related to the data classification, the learning data as the input is compared with the output of the neural network to calculate the error. The calculated error is back-propagated in a reverse direction (i.e., a direction from the output layer toward the input layer) in the neural network and connection weights of respective nodes of each layer of the neural network may be updated according to the back propagation. A variation amount of the updated connection weight of each node may be determined according to a learning rate. Calculation of the neural network for the input data and the back-propagation of the error may constitute a learning cycle (epoch). The learning rate may be applied differently according to the number of repetition times of the learning cycle of the neural network. For example, in an initial stage of the learning of the neural network, the neural network ensures a certain level of performance quickly by using a high learning rate, thereby increasing efficiency and uses a low learning rate in a latter stage of the learning, thereby increasing accuracy.

In learning of the neural network, the learning data may be generally a subset of actual data (i.e., data to be processed using the learned neural network), and as a result, there may be a learning cycle in which errors for the learning data decrease, but the errors for the actual data increase. Overfitting is a phenomenon in which the errors for the actual data increase due to excessive learning of the learning data. For example, a phenomenon in which the neural network that learns a cat by showing a yellow cat sees a cat other than the yellow cat and does not recognize the corresponding cat as the cat may be a kind of overfitting. The overfitting may act as a cause which increases the error of the machine learning algorithm. Various optimization methods may be used in order to prevent the overfitting. In order to prevent the overfitting, a method such as increasing the learning data, regularization, dropout of omitting a part of the node of the network in the process of learning, utilization of a batch normalization layer, etc., may be applied.

Figure 3:
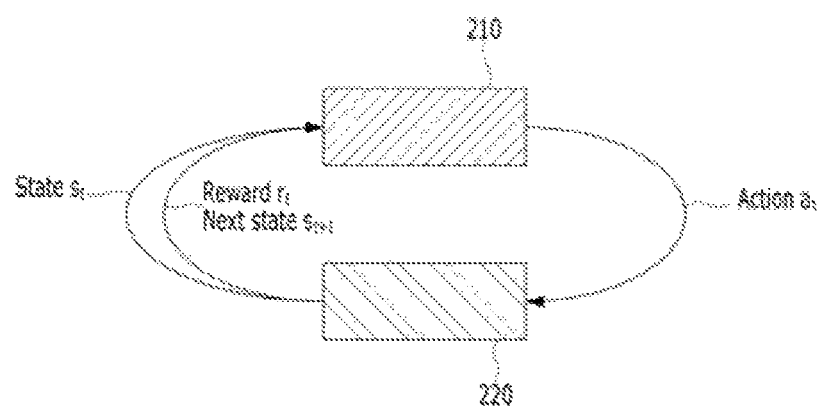
FIG. 3 is a conceptual view illustrating a reinforcement learning process of a neural network model according to an exemplary embodiment of the present disclosure.

FIG. 3 is a conceptual view illustrating a reinforcement learning process of a neural network model according to an exemplary embodiment of the present disclosure.

Reinforcement learning is a learning method that trains a neural network model based on a reward calculated for an action selected by neural network model so as to determine a better action based on a state. The state as a set of values representing what a situation is at a current time point may be appreciated as an input of the neural network model. The action which is called determination according to an option which may be taken by the neural network model may be appreciated as an output of the neural network model. The reward refers to a gain acquired when the neural network model performs any action, and represents an immediate value for evaluating a current state and the action. The reinforcement learning may be appreciated as learning through trial and error in that the reward is given for the determination (i.e., action). The reward given to the neural network model in the process of the reinforcement learning may be a reward in which results of various actions are accumulated. By considering the reward according to various states and actions through the reinforcement learning, a neural network model may be generated, which makes a return such as the reward itself or a total sum of rewards become the maximum. In the present disclosure, the neural network model may be interchangeably used with the term agent which is a subject that judges which action to do according to a surrounding state. Referring to FIG. 3, there is an environment 220 to which an agent 210 belongs in the reinforcement learning. The environment 220 may be appreciated as meaning setting itself for the reinforcement learning of the agent 210. When the agent 210 does the action, the state is changed through the environment 220, and the agent 210 may also receive the reward. An object of the reinforcement learning is to train the agent 210 so as to receive the maximum reward in the given environment 220.

According to an exemplary embodiment of the present disclosure, the computing device 100 may train the neural network model through reinforcement learning based on a state including current environmental information, an action of adjusting control information included in the environmental information, and a reward determined through the above-described process. The computing device 100 allows the neural network model to perform the action of adjusting the control information included in the environmental information, and allows the neural network model to perform an action according to a next cycle by returning the reward according to the action jointly with the state to perform the reinforcement learning for the neural network model. For example, the computing device 100 may perform an action at a specific time point t, which adjusts the control information based on a state at the specific time point t through the neural network model. The computing device 100 may estimate a reward at a next time point t+1 for the action at the specific time point t, and return the estimated reward to the neural network model. The computing device 100 may input the state and the reward at the next time point t+1 into the neural network model and perform the action at the next time point t+1. The computing device 100 may perform the reinforcement learning for the neural network model so as to more accurately predict environmental information at continuous future time points by repeating such a cycle. Specifically, the control information which the computing device 100 generates based on the reinforcement learning agent may include at least one of control information for a compressor RPM value, control information for a valve opening amount (e.g., a refrigerant expansion valve opening amount), control information for a heating amount of a cooling water heater, control information for a condenser, control information for an evaporator, control information for a radiator, control information for an accumulator, control information for a chiller, control information for an outdoor heat exchanger, and control information for an air purifying device, and control information for a waste heat recovery device. However, the control information is not limited thereto, and various elements may be included according to a situation. Further, the reward may be calculated based on internal environmental information of the heating, ventilation, & air conditioning (HVAC) system or the thermal management system, and the internal environmental information may include at least one of evaporator information, cooler information, heater information, waste heat recovery information, temperature information, humidity information, air cleanliness information, or air flow information. Further, the internal environmental information of the HVAC system or the thermal management system may be acquired based on a simulation environment that simulates an interaction of the HVAC system or the thermal management system. In an exemplary embodiment, the simulation environment may be implemented by a dynamics model including the neural network structure. Meanwhile, the simulation environment is not limited to the exemplary embodiment of simulating the interaction of the HVAC system or the thermal management system, and may be implemented in various forms. For example, the simulation environment may simulate various types of devices that control the temperature, the humidity, the air cleanliness, and the air flow. Further, the simulation environment may also include an exemplary embodiment that simulates various types of thermal management devices, such as an eco-friendly vehicle integrated thermal management device.

Figure 4:
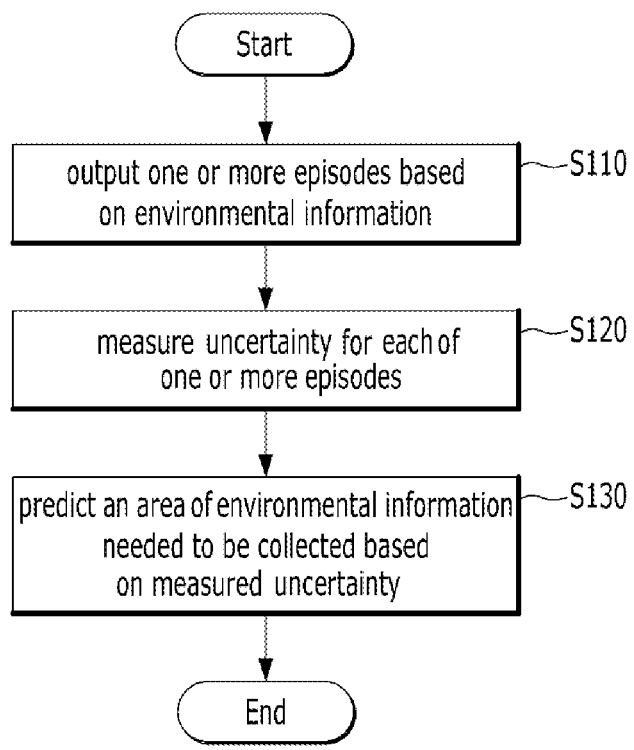
FIG. 4 is a flowchart illustrating a method for predicting an area of environmental information needed to be collected by using uncertainty information according to an exemplary embodiment of the present disclosure.

FIG. 4 is a flowchart illustrating a method for predicting an area of environmental information needed to be collected by using uncertainty information according to an exemplary embodiment of the present disclosure.

The computing device 100 according to an exemplary embodiment of the present disclosure may directly obtain "environmental information for predicting an area of information needed to be collected by using uncertainty information" or receive the "environmental information" from an external system. The external system may be a server or database that stores and manages the environmental information for predicting the area of information needed to be collected. The computing device 100 may use the environmental information obtained directly or received from the external system as "input data for predicting the area of information needed to be collected".

The computing device 100 may output one or more episodes based on the environmental information (S110). For example, the computing device 100 may output one or more episodes by inputting the environmental information into a first neural network model. In this case, the first neural network model may include a reinforcement-learning agent and an environment to which the agent belongs, and the environment to which the agent belongs may be implemented based on the dynamics model. In this case, the dynamics model may include a statistical model or a neural network model that simulates a vehicle HVAC system or thermal management system. For example, the first neural network model may include a model that predicts environmental information at the time point t+1 by inputting the control information among the environmental information according to the time point t. Further, the reinforcement-learning agent uses the predicted environmental information as an input for next time-point prediction to predict environmental information at continuous future time points. Further, the first neural network model may predict information such as a compressor energy consumption amount by inputting the environmental information according to the time point t. Additionally, the first neural network model may correspond to a neural network model pre-trained based on the environmental information. Further, the environmental information may include external environmental information, the internal environmental information, and the control information, and the environmental information may include a data set collected in a vehicle heating, ventilation, & and air conditioning system, the internal environmental information may include at least one of evaporator information, cooler information, heater information, waste heat recovery information, temperature information, humidity information, air cleanliness information, or air flow information, and the control information may include at least one of compressor information, valve information, heating amount information, control information for a heating amount of a cooling water heater, control information for a condenser, control information for an evaporator, control information for a radiator, control information for an accumulator, control information for a chiller, control information for an outdoor heat exchanger, and control information for an air purifying device, and control information for a waste heat recovery device. Specifically, the external environmental information may include information determined outside the dynamics model and granted to the model. For example, the external environmental information may include a vehicle speed, an external temperature, an air flow of the air conditioning device, an air inflow amount, weather information, external humidity, etc. The internal environmental information may include information which is observable inside the vehicle heating, ventilation, & air conditioning system, and include physical amount information measured by a specific sensor. For example, the internal environmental information may include information such as an evaporator discharge temperature, a heater core discharge temperature, an evaporator pressure, a cooler pressure, etc. Further, the control information may include information on control numerical values of the vehicle heating, ventilation, & and air conditioning system or thermal management system. For example, the control information may include information such as control information for a compressor RPM value, control information for a valve opening amount (e.g., a refrigerant expansion valve opening amount), control information for a heating amount of a cooling water heater, control information for a condenser, control information for an evaporator, control information for a radiator, control information for an accumulator, control information for a chiller, control information for an outdoor heat exchanger, and control information for an air purifying device, and control information for a waste heat recovery device. The environmental information may be input into the first neural network model and be used in a process of outputting one or more episodes, and will be described below through FIG. 5 below, which is a specific process. In this case, the episode may mean a sequence of (state, action, and reward) which the agent goes through from an initial state to a terminal state. The episode may also be expressed as a set or a trajectory of a rollout.

The computing device 100 may measure uncertainty for each of one or more episodes output through step S110 (S120). For example, the computing device 100 inputs one or more episodes into a second neural network model to measure an uncertainty for each of the one or more episodes and calculate an average of the uncertainties measured for the one or more episodes. In this case, the second neural network model may be pre-trained to measure the uncertainty based on the environmental information, and may correspond to a neural network model in which a Monte Carlo dropout scheme is used. In this case, the uncertainty may include out of distribution test data which represents a case where data of a type which is never used once upon learning the neural network model is used upon testing, Aleatoric uncertainty generated by data's unique noise, and Epistemic uncertainty generated in the model itself due to the lack of data. A specific process of inputting one or more episodes into the second neural network model to measure the uncertainty for each episode will be described below with reference to FIGS. 6 and 7.

The computing device 100 may predict an area of the environmental information needed to be collected based on the uncertainty measured through step S120 (S130). Specifically, the computing device 100 may predict a collection area of data based on the calculated average of the uncertainty. For example, the computing device 100 may choose a largest average of the uncertainties among the averages of the uncertainties, select an area of environmental information corresponding to the chosen largest average of the uncertainties, and predict the selected area of the environmental information as the area of the environmental information needed to be collected. Through this, a technical effect capable of preventing information collection for an area which is duplicated or not required in the process of additionally collecting the environmental information may be obtained. A specific process of predicting the area of the environmental information needed to be collected based on the measured uncertainty will be hereinafter described below in FIG. 7.

Figure 5:
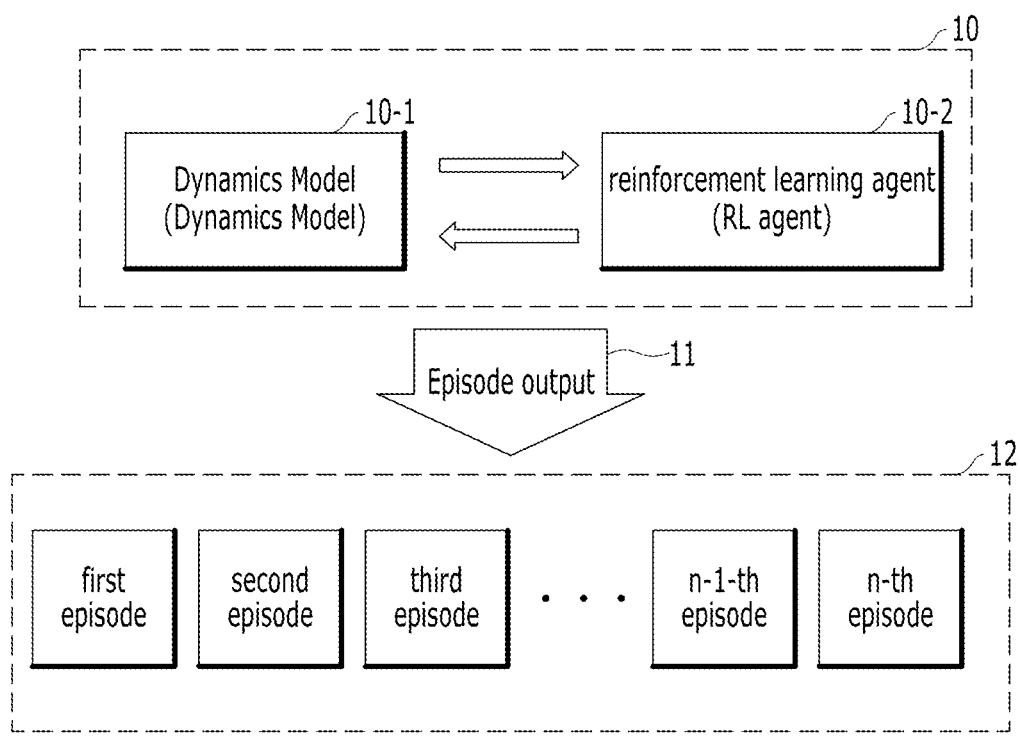
FIG. 5 is a schematic view for describing a process of outputting one or more episodes by inputting environmental information into a first neural network model according to the exemplary embodiment of the present disclosure.

FIG. 5 is a schematic view for describing a process of outputting one or more episodes by inputting environmental information into a first neural network model according to the exemplary embodiment of the present disclosure.

The computing device 100 according to an exemplary embodiment of the present disclosure may use the environmental information obtained directly or received from the external system as "input data for predicting an area of the environmental information needed to be collected by using uncertainty information".

Referring to FIG. 5, the computing device 100 may output one or more episodes 12 by inputting the environmental information into a first neural network model 10 (11). In this case, the first neural network model 10 may include a reinforcement-learning agent 10-2 and an environment to which the agent belongs, and the environment to which the agent belongs may be implemented based on a dynamics model 10-1. In this case, the dynamics model 10-1 may include a statistical model or a neural network model that simulates a vehicle HVAC system or thermal management system. For example, the first neural network model 10 may include a model that predicts environmental information at the time point t+1 by inputting the control information among the environmental information at the time point t. Further, the reinforcement-learning agent 10-2 uses the predicted environmental information as an input for next time-point prediction to predict environmental information at continuous future time points. Further, the first neural network model 10 may predict information such as a compressor energy consumption amount by inputting the environmental information according to the time point t. Meanwhile, according to an exemplary embodiment of the present disclosure, the computing device 100 may adjust external environmental information included in the environmental information, and output one or more episodes 12 based on the adjusted external environmental information. The external environmental information may include information determined outside the dynamics model and granted to the model, and include information such as a vehicle speed, an external temperature, an air flow of the air conditioning device, an air inflow amount, weather information, external humidity, etc.

According to an exemplary embodiment of the present disclosure, the computing device 100 may adjust the external temperature among the environmental information, output a reinforcement-learning episode for the external temperature by using the first neural network model 10, and output a very first episode as a first episode. Thereafter, the computing device 100 may output one or more reinforcement-learning episodes for the external temperature by using the first neural network model 10 while adjusting the external temperature among the environmental information similarly to the case of the first episode. For example, the computing device 100 may output a first reinforcement-learning episode for the external temperature while adjusting the external temperature among the environmental information by +0.1 degree from −10° C. by using the first neural network model 10. Further, the computing device 100 may output a second reinforcement-learning episode for the external temperature while similarly adjusting the external temperature among the environmental information by +0.1 degree from −10° C. by using the first neural network model 10. For example, the computing device 100 may output one or more reinforcement-learning episodes for the external temperature by using the first neural network model 10. Meanwhile, the external temperature is just disclosed as an example for the external environmental information, and one or more episodes output based on the external environmental information and the adjusted external environmental information is not limited to the reinforcement-learning episode for the external temperature.

A specific process of measuring the uncertainty for each of the one or more output episodes will be hereinafter described below with reference to FIG. 6.

Figure 6:
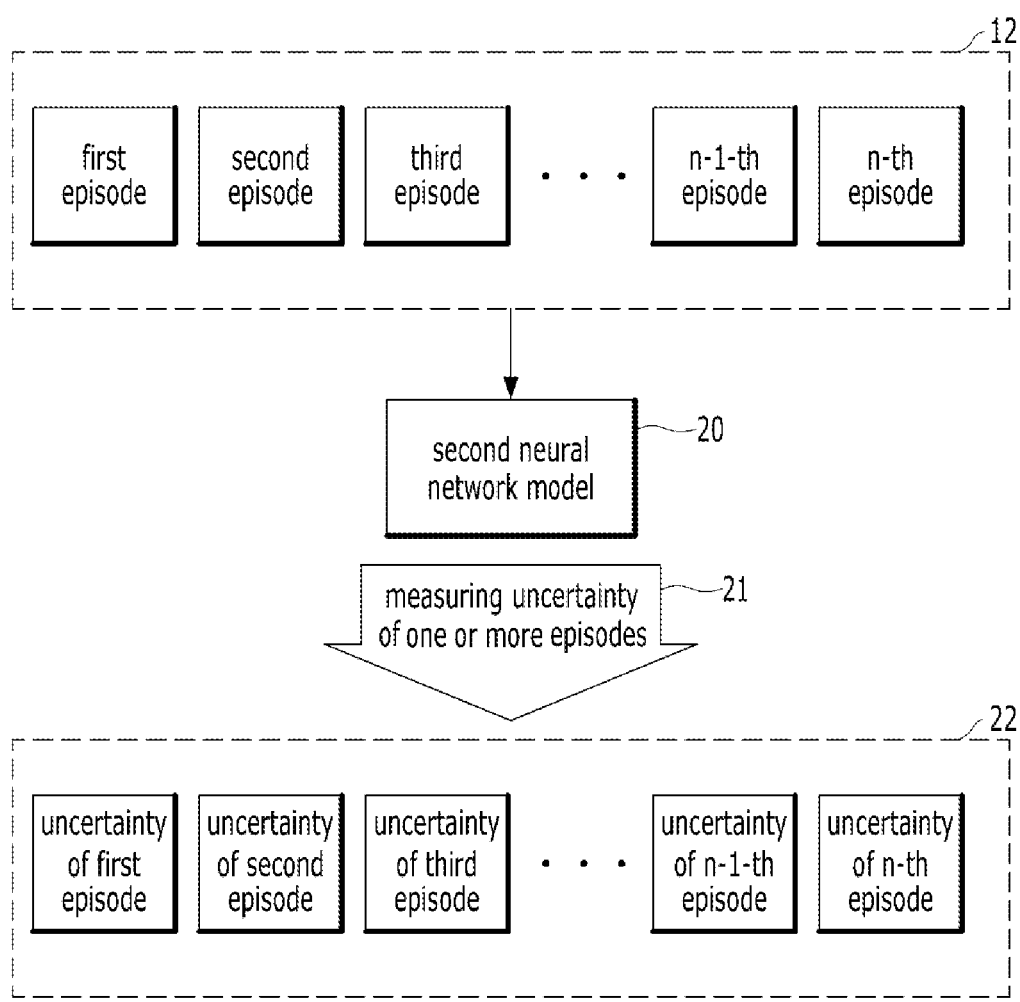
FIG. 6 is a schematic view illustrating a process of measuring uncertainty for each of one or more episodes according to the exemplary embodiment of the present disclosure.

FIG. 6 is a schematic view illustrating a process of measuring uncertainty for each of one or more episodes according to the exemplary embodiment of the present disclosure.

Referring to FIG. 6, the computing device 100 may measure an uncertainty 22 for each episode by inputting the one or more output episodes 12 into a second neural network model 20 (21). In this case, the second neural network model 20 may correspond to a neural network model pre-trained to measure the uncertainty based on the environmental information, and may correspond to a neural network model in which a Monte Carlo dropout scheme is used. Meanwhile, the uncertainty may include out of distribution test data which represents a case where data of a type which is never used once upon learning the neural network model is used upon testing, Aleatoric uncertainty generated by data's unique noise, and Epistemic uncertainty generated in the model itself due to the lack of data. Further, the Monte Carlo dropout scheme may mean a scheme of applying dropout upon learning the neural network model, and applying the dropout even in an evaluation step. Meanwhile, since the dropout is used even in the evaluation step of the neural network model, and the dropout is randomly applied, a result may be slightly different for each implementation. Therefore, when the same data is inserted into the neural network model learned by the Monte Carlo dropout scheme T times and a standard deviation of the result is calculated, if the data is data used for learning and the neural network model is sufficiently learned, the standard deviation is very small regardless of the number of insertion times, and the result may be output as almost the same values, while when new data which is not observed is input, the neural network model is not learned, so a more random result is output according to by which scheme the data is dropped out, and the standard deviation may be calculated to be very large. Therefore, the second neural network model 20 in which the Monte Carlo dropout scheme is used may measure the uncertainty by using the calculated standard deviation. Specifically, the computing device 100 may input one episode into the second neural network model 20 and calculate the standard deviation of the input episode, and use the calculated standard deviation of the episode as an uncertainty index of the input episode. For example, according to an exemplary embodiment of the present disclosure, the computing device 100 may measure uncertainty for each reinforcement-learning episode for the external temperature by inputting one or more reinforcement-learning episodes for the external temperature into the second neural network model 20. Specifically, the computing device 100 may input the first reinforcement-learning episode for the external temperature into the second neural network model 20 and calculate the standard deviation of the first reinforcement-learning episode for the external temperature, and use the calculated standard deviation of the episode as an uncertainty index of the first reinforcement-learning episode for the external temperature. A specific process of calculating the measured average of the uncertainties and predicting a collection area of data based on the calculated average of the uncertainties will be hereinafter described below in FIG. 7.

Figure 7:
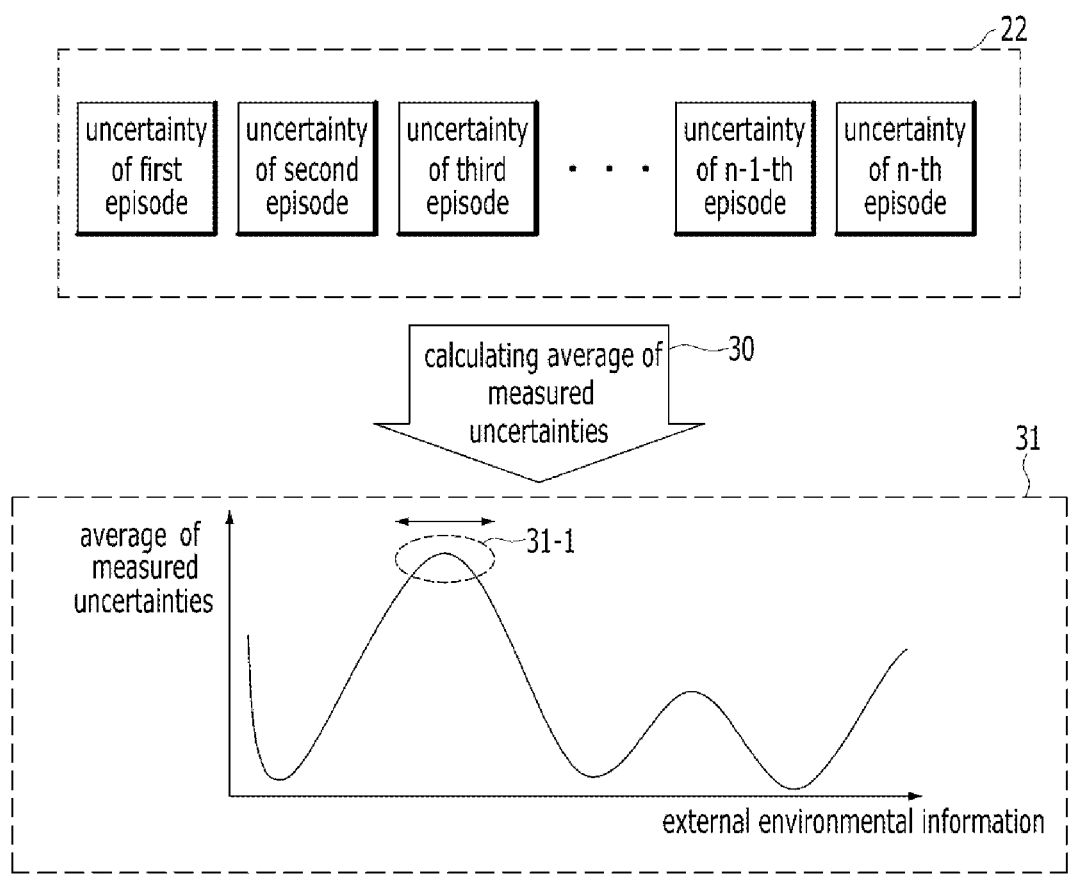
FIG. 7 is a schematic view illustrating a process of calculating an average of measured uncertainty and predicting a collection area of data based on the calculated average of the uncertainties according to the exemplary embodiment of the present disclosure.

FIG. 7 is a schematic view illustrating a process of calculating an average the measured uncertainties and predicting a collection area of data based on the calculated average of the uncertainties according to the exemplary embodiment of the present disclosure.

Referring to FIG. 7, the computing device 100 may calculate an average of uncertainties 22 measured for each of the one or more episodes (30), and output "an average 31 of uncertainties corresponding to external environmental information, respectively". For example, the computing device 100 may measure the uncertainty 22 for each episode by inputting one or more episodes for the external temperature into the second neural network model 20. In this case, in the case of the first reinforcement-learning episode for the external temperature, when the external temperature is −10° C., a first standard deviation may be calculated as 15, and the calculated first standard deviation (=15) may be measured as the uncertainty at −10° C. of the first reinforcement learning episode for the external temperature. Further, in the case of the second reinforcement-learning episode for the external temperature, when the external temperature is −10° C., a second standard deviation may be calculated as 25, and the calculated second standard deviation (=25) may be measured as the uncertainty at −10° C. of the second reinforcement learning episode for the external temperature. Further, a measurement process of the uncertainty is repeated to measure an uncertainty at −10° C. of an n-th reinforcement-learning episode for the external temperature. Further, the computing device 100 may calculate an average from "the uncertainty at −10° C. of the first reinforcement-learning episode for the external temperature" to "the uncertainty at −10° C. of the n-th reinforcement-learning episode for the external temperature". Through this, "an average of uncertainties corresponding to external temperatures, respectively" may be calculated. Specifically, when the external temperature is −10° C., the average of the uncertainty may be calculated as 10, when the external temperature is 0° C., the average of the uncertainty may be calculated as 8, and when the external temperature is +10° C., the average of the uncertainty may be calculated as 15. However, "the average of the uncertainties corresponding to the external temperatures, respectively" is just an example of "an average 31 of uncertainties corresponding to external environmental information, respectively", and "the average 31 of the uncertainties corresponding to the external environmental information, respectively" is not limited to the external temperature, and various examples such as the vehicle speed, the airflow of the air conditioning device, an air inflow amount, etc., may be utilized.

The computing device 100 may choose a largest average of the uncertainties among the calculated averages of the uncertainties, select an area 31-1 of environmental information corresponding to the chosen largest average of the uncertainties, and predict the selected area of the environmental information as an area of the environmental information needed to be collected. For example, averages of uncertainties for the external temperature may be calculated as 10, 8, and 15, respectively in the case of −10° C., 0° C., and +10° C., the largest average of the uncertainty may be chosen as 15, and the area of +10° C. corresponding to 15 which is the largest average of the uncertainty may be selected for the external temperature, and predicted as the area of the environmental information needed to be collected. Specifically, the area of +10° C. corresponding to 15 which is the largest average of the uncertainties may be selected for the external temperature and predicted as the area of the environmental information needed to be collected, and the user may additionally collect the environmental information for the area of +10° C. having the largest uncertainty, and through this, a technical effect capable of preventing information collection for the area which is duplicated or not required in the process of additionally collecting the environmental information may be obtained. Meanwhile, the external temperature is just disclosed as an example for the external environmental information, and one or more episodes output based on the external environmental information and the adjusted external environmental information, the uncertainty, and the area of the environmental information needed to be collected are not limited to the external temperature, and various examples such as the vehicle speed, the airflow of the air conditioning device, an air inflow amount, weather information, or external humidity, etc., may be utilized.

In the meantime, according to an embodiment of the present disclosure, a computer readable medium storing a data structure is disclosed.

The data structure may refer to organization, management, and storage of data that enable efficient access and modification of data. The data structure may refer to organization of data for solving a specific problem (for example, data search, data storage, and data modification in the shortest time). The data structure may also be defined with a physical or logical relationship between the data elements designed to support a specific data processing function. A logical relationship between data elements may include a connection relationship between user defined data elements. A physical relationship between data elements may include an actual relationship between the data elements physically stored in a computer readable storage medium (for example, a permanent storage device). In particular, the data structure may include a set of data, a relationship between data, and a function or a command applicable to data. Through the effectively designed data structure, the computing device may perform a calculation while minimally using resources of the computing device. In particular, the computing device may improve efficiency of calculation, reading, insertion, deletion, comparison, exchange, and search through the effectively designed data structure.

The data structure may be divided into a linear data structure and a non-linear data structure according to the form of the data structure. The linear data structure may be the structure in which only one data is connected after one data. The linear data structure may include a list, a stack, a queue, and a deque. The list may mean a series of dataset in which order exists internally. The list may include a linked list. The linked list may have a data structure in which data is connected in a method in which each data has a pointer and is linked in a single line. In the linked list, the pointer may include information about the connection with the next or previous data. The linked list may be expressed as a single linked list, a double linked list, and a circular linked list according to the form. The stack may have a data listing structure with limited access to data. The stack may have a linear data structure that may process (for example, insert or delete) data only at one end of the data structure. The data stored in the stack may have a data structure (Last In First Out, LIFO) in which the later the data enters, the sooner the data comes out. The queue is a data listing structure with limited access to data, and may have a data structure (First In First Out, FIFO) in which the later the data is stored, the later the data comes out, unlike the stack. The deque may have a data structure that may process data at both ends of the data structure.

The non-linear data structure may be the structure in which the plurality of data is connected after one data. The non-linear data structure may include a graph data structure. The graph data structure may be defined with a vertex and an edge, and the edge may include a line connecting two different vertexes. The graph data structure may include a tree data structure. The tree data structure may be the data structure in which a path connecting two different vertexes among the plurality of vertexes included in the tree is one. That is, the tree data structure may be the data structure in which a loop is not formed in the graph data structure.

Throughout the present specification, a calculation model, a nerve network, the network function, and the neural network may be used with the same meaning. Hereinafter, the terms of the calculation model, the nerve network, the network function, and the neural network are unified and described with a neural network. The data structure may include a neural network. Further, the data structure including the neural network may be stored in a computer readable medium. The data structure including the neural network may also include preprocessed data for processing by the neural network, data input to the neural network, a weight of the neural network, a hyper-parameter of the neural network, data obtained from the neural network, an active function associated with each node or layer of the neural network, and a loss function for training of the neural network. The data structure including the neural network may include predetermined configuration elements among the disclosed configurations. That is, the data structure including the neural network may include the entirety or a predetermined combination of pre-processed data for processing by neural network, data input to the neural network, a weight of the neural network, a hyper parameter of the neural network, data obtained from the neural network, an active function associated with each node or layer of the neural network, and a loss function for training the neural network. In addition to the foregoing configurations, the data structure including the neural network may include predetermined other information determining a characteristic of the neural network. Further, the data structure may include all type of data used or generated in a computation process of the neural network, and is not limited to the foregoing matter. The computer readable medium may include a computer readable recording medium and/or a computer readable transmission medium. The neural network may be formed of a set of interconnected calculation units which are generally referred to as "nodes". The "nodes" may also be called "neurons." The neural network consists of one or more nodes.

The data structure may include data input to the neural network. The data structure including the data input to the neural network may be stored in the computer readable medium. The data input to the neural network may include training data input in the training process of the neural network and/or input data input to the training completed neural network. The data input to the neural network may include data that has undergone pre-processing and/or data to be pre-processed. The pre-processing may include a data processing process for inputting data to the neural network. Accordingly, the data structure may include data to be pre-processed and data generated by the pre-processing. The foregoing data structure is merely an example, and the present disclosure is not limited thereto.

The data structure may include a weight of the neural network (in the present specification, weights and parameters may be used with the same meaning), Further, the data structure including the weight of the neural network may be stored in the computer readable medium. The neural network may include a plurality of weights. The weight is variable, and in order for the neural network to perform a desired function, the weight may be varied by a user or an algorithm. For example, when one or more input nodes are connected to one output node by links, respectively, the output node may determine a data value output from the output node based on values input to the input nodes connected to the output node and the weight set in the link corresponding to each of the input nodes. The foregoing data structure is merely an example, and the present disclosure is not limited thereto.

For a non-limited example, the weight may include a weight varied in the neural network training process and/or the weight when the training of the neural network is completed. The weight varied in the neural network training process may include a weight at a time at which a training cycle starts and/or a weight varied during a training cycle. The weight when the training of the neural network is completed may include a weight of the neural network completing the training cycle. Accordingly, the data structure including the weight of the neural network may include the data structure including the weight varied in the neural network training process and/or the weight when the training of the neural network is completed. Accordingly, it is assumed that the weight and/or a combination of the respective weights are included in the data structure including the weight of the neural network. The foregoing data structure is merely an example, and the present disclosure is not limited thereto.

The data structure including the weight of the neural network may be stored in the computer readable storage medium (for example, a memory and a hard disk) after undergoing a serialization process. The serialization may be the process of storing the data structure in the same or different computing devices and converting the data structure into a form that may be reconstructed and used later. The computing device may serialize the data structure and transceive the data through a network. The serialized data structure including the weight of the neural network may be reconstructed in the same or different computing devices through deserialization. The data structure including the weight of the neural network is not limited to the serialization. Further, the data structure including the weight of the neural network may include a data structure (for example, in the non-linear data structure, B-Tree, Trie, m-way search tree, AVL tree, and Red-Black Tree) for improving efficiency of the calculation while minimally using the resources of the computing device. The foregoing matter is merely an example, and the present disclosure is not limited thereto.

The data structure may include a hyper-parameter of the neural network. The data structure including the hyper-parameter of the neural network may be stored in the computer readable medium. The hyper-parameter may be a variable varied by a user. The hyper-parameter may include, for example, a learning rate, a cost function, the number of times of repetition of the training cycle, weight initialization (for example, setting of a range of a weight value to be weight-initialized), and the number of hidden units (for example, the number of hidden layers and the number of nodes of the hidden layer). The foregoing data structure is merely an example, and the present disclosure is not limited thereto.

Figure 8:
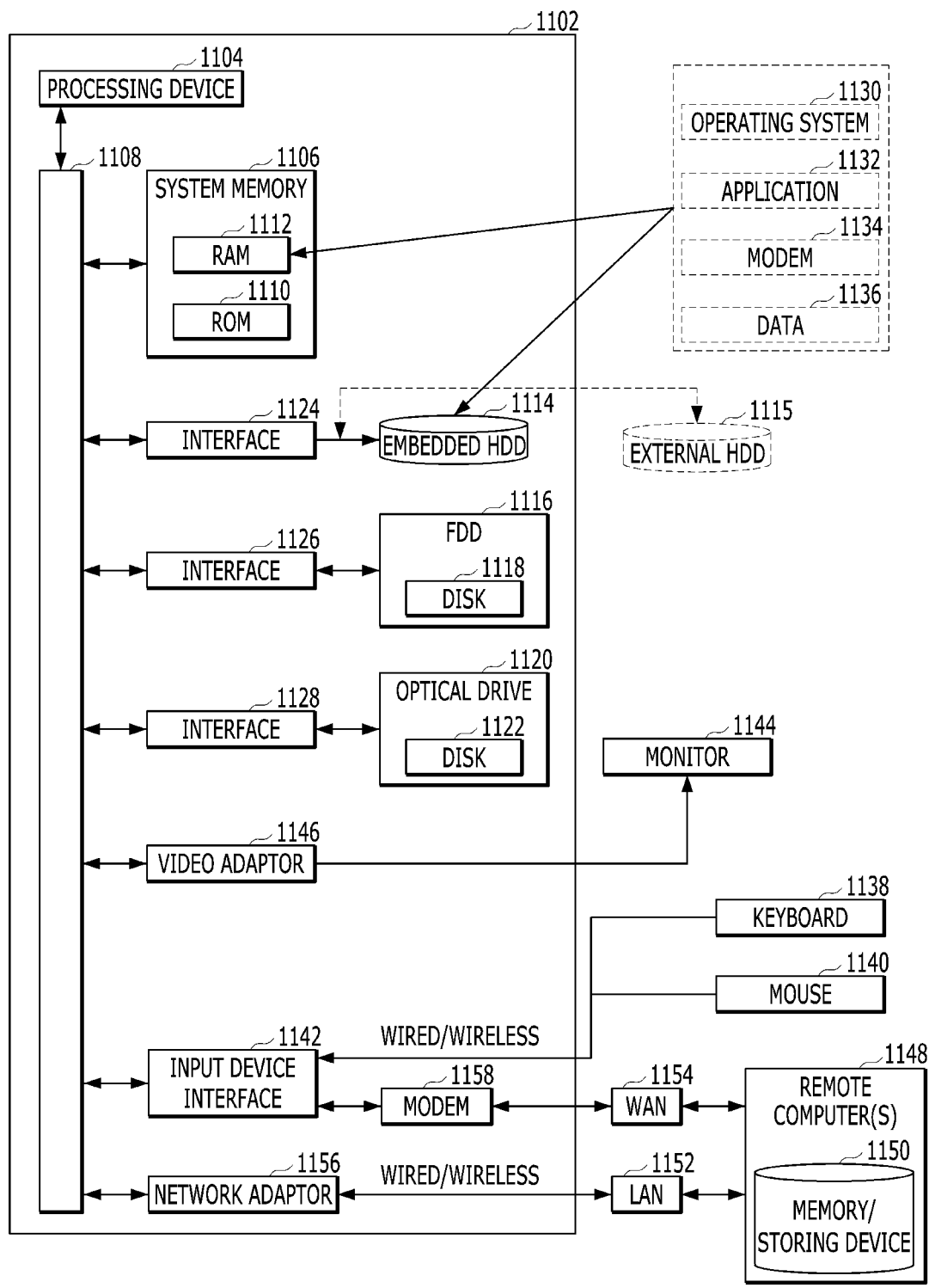
FIG. 8 is a simple and normal schematic view of an exemplary computing environment in which the exemplary embodiments of the present disclosure may be implemented.

FIG. 8 is a simple and general schematic diagram illustrating an example of a computing environment in which the embodiments of the present disclosure are implementable.

The present disclosure has been described as being generally implementable by the computing device, but those skilled in the art will appreciate well that the present disclosure is combined with computer executable commands and/or other program modules executable in one or more computers and/or be implemented by a combination of hardware and software.

In general, a program module includes a routine, a program, a component, a data structure, and the like performing a specific task or implementing a specific abstract data form. Further, those skilled in the art will well appreciate that the method of the present disclosure may be carried out by a personal computer, a hand-held computing device, a microprocessor-based or programmable home appliance (each of which may be connected with one or more relevant devices and be operated), and other computer system configurations, as well as a single-processor or multiprocessor computer system, a mini computer, and a main frame computer.

The embodiments of the present disclosure may be carried out in a distribution computing environment, in which certain tasks are performed by remote processing devices connected through a communication network. In the distribution computing environment, a program module may be located in both a local memory storage device and a remote memory storage device.

The computer generally includes various computer readable media. The computer accessible medium may be any type of computer readable medium, and the computer readable medium includes volatile and non-volatile media, transitory and non-transitory media, and portable and non-portable media. As a non-limited example, the computer readable medium may include a computer readable storage medium and a computer readable transport medium. The computer readable storage medium includes volatile and non-volatile media, transitory and non-transitory media, and portable and non-portable media constructed by a predetermined method or technology, which stores information, such as a computer readable command, a data structure, a program module, or other data. The computer readable storage medium includes a RAM, a Read Only Memory (ROM), an Electrically Erasable and Programmable ROM (EEPROM), a flash memory, or other memory technologies, a Compact Disc (CD)-ROM, a Digital Video Disk (DVD), or other optical disk storage devices, a magnetic cassette, a magnetic tape, a magnetic disk storage device, or other magnetic storage device, or other predetermined media, which are accessible by a computer and are used for storing desired information, but is not limited thereto.

The computer readable transport medium generally implements a computer readable command, a data structure, a program module, or other data in a modulated data signal, such as a carrier wave or other transport mechanisms, and includes all of the information transport media. The modulated data signal means a signal, of which one or more of the characteristics are set or changed so as to encode information within the signal. As a non-limited example, the computer readable transport medium includes a wired medium, such as a wired network or a direct-wired connection, and a wireless medium, such as sound, Radio Frequency (RF), infrared rays, and other wireless media. A combination of the predetermined media among the foregoing media is also included in a range of the computer readable transport medium.

An illustrative environment 1100 including a computer 1102 and implementing several aspects of the present disclosure is illustrated, and the computer 1102 includes a processing device 1104, a system memory 1106, and a system bus 1108. The system bus 1108 connects system components including the system memory 1106 (not limited) to the processing device 1104. The processing device 1104 may be a predetermined processor among various commonly used processors. A dual processor and other multi-processor architectures may also be used as the processing device 1104.

The system bus 1108 may be a predetermined one among several types of bus structure, which may be additionally connectable to a local bus using a predetermined one among a memory bus, a peripheral device bus, and various common bus architectures. The system memory 1106 includes a ROM 1110, and a RAM 1112. A basic input/output system (BIOS) is stored in a non-volatile memory 1110, such as a ROM, an EPROM, and an EEPROM, and the BIOS includes a basic routing helping a transport of information among the constituent elements within the computer 1102 at a time, such as starting. The RAM 1112 may also include a high-rate RAM, such as a static RAM, for caching data.

The computer 1102 also includes an embedded hard disk drive (HDD) 1114 (for example, enhanced integrated drive electronics (EIDE) and serial advanced technology attachment (SATA))—the embedded HDD 1114 being configured for exterior mounted usage within a proper chassis (not illustrated)—a magnetic floppy disk drive (FDD) 1116 (for example, which is for reading data from a portable diskette 1118 or recording data in the portable diskette 1118), and an optical disk drive 1120 (for example, which is for reading a CD-ROM disk 1122, or reading data from other high-capacity optical media, such as a DVD, or recording data in the high-capacity optical media). A hard disk drive 1114, a magnetic disk drive 1116, and an optical disk drive 1120 may be connected to a system bus 1108 by a hard disk drive interface 1124, a magnetic disk drive interface 1126, and an optical drive interface 1128, respectively. An interface 1124 for implementing an outer mounted drive includes, for example, at least one of or both a universal serial bus (USB) and the Institute of Electrical and Electronics Engineers (IEEE) 1394 interface technology.

The drives and the computer readable media associated with the drives provide non-volatile storage of data, data structures, computer executable commands, and the like. In the case of the computer 1102, the drive and the medium correspond to the storage of random data in an appropriate digital form. In the description of the computer readable media, the HDD, the portable magnetic disk, and the portable optical media, such as a CD, or a DVD, are mentioned, but those skilled in the art will well appreciate that other types of computer readable media, such as a zip drive, a magnetic cassette, a flash memory card, and a cartridge, may also be used in the illustrative operation environment, and the predetermined medium may include computer executable commands for performing the methods of the present disclosure.

A plurality of program modules including an operation system 1130, one or more application programs 1132, other program modules 1134, and program data 1136 may be stored in the drive and the RAM 1112. An entirety or a part of the operation system, the application, the module, and/or data may also be cached in the RAM 1112. It will be well appreciated that the present disclosure may be implemented by several commercially usable operation systems or a combination of operation systems.

A user may input a command and information to the computer 1102 through one or more wired/wireless input devices, for example, a keyboard 1138 and a pointing device, such as a mouse 1140. Other input devices (not illustrated) may be a microphone, an IR remote controller, a joystick, a game pad, a stylus pen, a touch screen, and the like. The foregoing and other input devices are frequently connected to the processing device 1104 through an input device interface 1142 connected to the system bus 1108, but may be connected by other interfaces, such as a parallel port, an IEEE 1394 serial port, a game port, a USB port, an IR interface, and other interfaces.

A monitor 1144 or other types of display devices are also connected to the system bus 1108 through an interface, such as a video adaptor 1146. In addition to the monitor 1144, the computer generally includes other peripheral output devices (not illustrated), such as a speaker and a printer.

The computer 1102 may be operated in a networked environment by using a logical connection to one or more remote computers, such as remote computer(s) 1148, through wired and/or wireless communication. The remote computer(s) 1148 may be a work station, a computing device computer, a router, a personal computer, a portable computer, a microprocessor-based entertainment device, a peer device, and other general network nodes, and generally includes some or an entirety of the constituent elements described for the computer 1102, but only a memory storage device 1150 is illustrated for simplicity. The illustrated logical connection includes a wired/wireless connection to a local area network (LAN) 1152 and/or a larger network, for example, a wide area network (WAN) 1154. The LAN and WAN networking environments are general in an office and a company, and make an enterprise-wide computer network, such as an Intranet, easy, and all of the LAN and WAN networking environments may be connected to a worldwide computer network, for example, the Internet.

When the computer 1102 is used in the LAN networking environment, the computer 1102 is connected to the local network 1152 through a wired and/or wireless communication network interface or an adaptor 1156. The adaptor 1156 may make wired or wireless communication to the LAN 1152 easy, and the LAN 1152 also includes a wireless access point installed therein for the communication with the wireless adaptor 1156. When the computer 1102 is used in the WAN networking environment, the computer 1102 may include a modem 1158, is connected to a communication computing device on a WAN 1154, or includes other means setting communication through the WAN 1154 via the Internet. The modem 1158, which may be an embedded or outer-mounted and wired or wireless device, is connected to the system bus 1108 through a serial port interface 1142. In the networked environment, the program modules described for the computer 1102 or some of the program modules may be stored in a remote memory/storage device 1150. The illustrated network connection is illustrative, and those skilled in the art will appreciate well that other means setting a communication link between the computers may be used.

The computer 1102 performs an operation of communicating with a predetermined wireless device or entity, for example, a printer, a scanner, a desktop and/or portable computer, a portable data assistant (PDA), a communication satellite, predetermined equipment or place related to a wirelessly detectable tag, and a telephone, which is disposed by wireless communication and is operated. The operation includes a wireless fidelity (Wi-Fi) and Bluetooth wireless technology at least. Accordingly, the communication may have a pre-defined structure, such as a network in the related art, or may be simply ad hoc communication between at least two devices.

The Wi-Fi enables a connection to the Internet and the like even without a wire. The Wi-Fi is a wireless technology, such as a cellular phone, which enables the device, for example, the computer, to transmit and receive data indoors and outdoors, that is, in any place within a communication range of a base station. A Wi-Fi network uses a wireless technology, which is called IEEE 802.11 (a, b, g, etc.) for providing a safe, reliable, and high-rate wireless connection. The Wi-Fi may be used for connecting the computer to the computer, the Internet, and the wired network (IEEE 802.3 or Ethernet is used). The Wi-Fi network may be operated at, for example, a data rate of 11 Mbps (802.11a) or 54 Mbps (802.11b) in an unauthorized 2.4 and 5 GHz wireless band, or may be operated in a product including both bands (dual bands).

Those skilled in the art may appreciate that information and signals may be expressed by using predetermined various different technologies and techniques. For example, data, indications, commands, information, signals, bits, symbols, and chips referable in the foregoing description may be expressed with voltages, currents, electromagnetic waves, magnetic fields or particles, optical fields or particles, or a predetermined combination thereof.

Those skilled in the art will appreciate that the various illustrative logical blocks, modules, processors, means, circuits, and algorithm operations described in relationship to the embodiments disclosed herein may be implemented by electronic hardware (for convenience, called "software" herein), various forms of program or design code, or a combination thereof. In order to clearly describe compatibility of the hardware and the software, various illustrative components, blocks, modules, circuits, and operations are generally illustrated above in relation to the functions of the hardware and the software. Whether the function is implemented as hardware or software depends on design limits given to a specific application or an entire system. Those skilled in the art may perform the function described by various schemes for each specific application, but it shall not be construed that the determinations of the performance depart from the scope of the present disclosure.

Various embodiments presented herein may be implemented by a method, a device, or a manufactured article using a standard programming and/or engineering technology. A term "manufactured article" includes a computer program, a carrier, or a medium accessible from a predetermined computer-readable storage device. For example, the computer-readable storage medium includes a magnetic storage device (for example, a hard disk, a floppy disk, and a magnetic strip), an optical disk (for example, a CD and a DVD), a smart card, and a flash memory device (for example, an EEPROM, a card, a stick, and a key drive), but is not limited thereto. Further, various storage media presented herein include one or more devices and/or other machine-readable media for storing information.

It shall be understood that a specific order or a hierarchical structure of the operations included in the presented processes is an example of illustrative accesses. It shall be understood that a specific order or a hierarchical structure of the operations included in the processes may be rearranged within the scope of the present disclosure based on design priorities. The accompanying method claims provide various operations of elements in a sample order, but it does not mean that the claims are limited to the presented specific order or hierarchical structure.

The description of the presented embodiments is provided so as for those skilled in the art to use or carry out the present disclosure. Various modifications of the embodiments may be apparent to those skilled in the art, and general principles defined herein may be applied to other embodiments without departing from the scope of the present disclosure. Accordingly, the present disclosure is not limited to the embodiments suggested herein, and shall be interpreted within the broadest meaning range consistent to the principles and new characteristics presented herein.

What is claimed is:

1. A method for predicting an area of environmental information needed to be collected, the method performed by a computing device, the method comprising:

outputting one or more episodes based on environmental information by inputting the environmental information into a first neural network model, wherein the first neural network model corresponds to a neural network model pre-trained based on the environmental information, and wherein the first neural network model includes a reinforcement-learning agent;

measuring an uncertainty for each of the one or more episodes by inputting the one or more episodes into a second neural network model;

calculating an average of measured uncertainties for the one or more episodes;

choosing a largest average of the measured uncertainties among the calculated average of the uncertainties;

selecting an area of the environmental information corresponding to the chosen largest average of the uncertainties; and predicting an area of the environmental information needed to be collected based on the measured uncertainty and the calculated average of the uncertainties by predicting the selected area of the environmental information as the area of the environmental information needed to be collected; and training the first neural network model by inputting the predicted area of the environmental information to the reinforcement-learning agent, and wherein the reinforcement-learning agent uses the predicted environmental information for next time-point prediction to predict environmental information at continuous future time points.

2. The method of claim 1, wherein the environmental information includes external environmental information, internal environmental information, and control information, the external environmental information includes at least one of a vehicle speed, an external temperature, an air flow of an air conditioning device, an air inflow amount, weather information, or external humidity, the internal environmental information includes at least one of evaporator information, heater information, cooler information, waste heat recovery information, temperature information, humidity information, air cleanliness information, or air flow information, and the control information includes at least one of compressor information, valve information, heating amount information, control information for condenser, control information for an evaporator, control information for a radiator, control information for an accumulator, control information for a chiller, control information for an outdoor heat exchanger, control information for an air purifying device, or control information for a waste heat recovery device.

3. The method of claim 1, wherein the outputting of one or more episodes by inputting the environmental information into the first neural network model includes adjusting external environmental information included in the environmental information, and outputting one or more episodes based on the adjusted external environmental information.

4. The method of claim 1, wherein the first neural network model includes an environment to which the agent belongs, and wherein the environment to which the agent belongs is implemented based on a dynamics model.

5. The method of claim 1, wherein the second neural network model is pre-trained based on the environmental information, and corresponds to a neural network model in which a Monte Carlo dropout scheme is used.

6. A computer program stored in a non-transitory computer-readable storage medium, wherein when the computer program is executed by one or more processors, the computer program causes the one or more processors to perform operations for predicting an area of environmental information needed to be collected, and the operations comprise:

an operation of outputting one or more episodes based on environmental information by inputting the environmental information into a first neural network model, wherein the first neural network model corresponds to a neural network model pre-trained based on the environmental information, and wherein the first neural network model includes a reinforcement-learning agent;

an operation of measuring uncertainty for each of the one or more episodes by inputting the one or more episodes into a second neural network model;

an operation of calculating an average of measured uncertainties for the one or more episodes;

an operation of choosing a largest average of the measured uncertainties among the calculated average of the uncertainties;

an operation of selecting an area of the environmental information corresponding to the chosen largest average of the uncertainties; and an operation of predicting the selected area of the environmental information as an area of the environmental information needed to be collected; and an operation of training the first neural network model by inputting the predicted area of the environmental information to the reinforcement-learning agent, and wherein the reinforcement-learning agent uses the predicted environmental information for next time-point prediction to predict environmental information at continuous future time points.

7. A computing device comprising:

at least one processor; and a memory, wherein the at least one processor is configured to output one or more episodes based on environmental information by inputting the environmental information into a first neural network model, wherein the first neural network model corresponds to a neural network model pre-trained based on the environmental information, and wherein the first neural network model includes a reinforcement-learning agent, measure uncertainty for each of the one or more episodes by inputting the one or more episodes into a second neural network model, calculate an average of measured uncertainties for the one or more episodes, choose a largest average of the measured uncertainties among the calculated average of the uncertainties, select an area of the environmental information corresponding to the chosen largest average of the uncertainties, predict an area of the environmental information needed to be collected based on the measured uncertainty and the calculated average of the uncertainties by predicting the selected area of the environmental information as the area of the environmental information needed to be collected, and train the first neural network model by inputting the predicted area of the environmental information to the reinforcement-learning agent, and wherein the reinforcement-learning agent uses the predicted environmental information for next time-point prediction to predict environmental information at continuous future time points.

* * * * *